United States Patent [19]
Robertson

[11] 3,741,682
[45] June 26, 1973

[54] AERATORS
[75] Inventor: William Swan Robertson, Manchester, England
[73] Assignee: Simon-Hartley Limited, Stoke-on-Trent, Staffordshire, England
[22] Filed: Jan. 20, 1971
[21] Appl. No.: 108,120

[30] Foreign Application Priority Data
Feb. 13, 1970  Great Britain.................. 7,028/70

[52] U.S. Cl.................... 416/179, 416/188, 261/91
[51] Int. Cl............................................. F01d 5/04
[58] Field of Search............... 416/241 A, 179, 177, 416/182, 183, 188, 186, 235–237; 259/107, 108; 415/153; 261/91

[56] References Cited
UNITED STATES PATENTS
| 1,246,253 | 11/1917 | Fraser | 416/186 UX |
| 3,637,196 | 1/1972 | Kaelin | 261/91 |
| 3,323,782 | 6/1967 | Clough | 416/188 |
| 1,142,726 | 6/1915 | Phillips | 415/153 |
| 3,260,443 | 7/1966 | Garnett et al. | 416/182 |
| 1,072,549 | 9/1913 | Williams | 416/186 |
| 3,241,820 | 3/1966 | Clough | 416/188 |
| 3,182,972 | 5/1965 | Alsop et al. | 259/107 |
| 3,124,200 | 3/1964 | Wilson | 416/182 |
| 3,610,590 | 10/1971 | Kaelin | 416/177 |

Primary Examiner—Everette A. Powell, Jr.
Attorney—Norris & Bateman

[57] ABSTRACT

An aerator of the kind adapted to be rotated in the surface of a liquid for the purpose of agitating and aerating same, for example in the aeration of sewage liquors in the so-called activated sludge process, comprising a support member adapted to be rotated about its central vertical axis, a plurality of angularly spaced blades secured to the underside of said member and extending from a central region of the member towards its periphery, a plate being secured to the lower edge of each said blade and extending on both sides thereof at least along a part of the length of the blade from its outer end towards the center of the aerator.

9 Claims, 3 Drawing Figures

PATENTED JUN 26 1973 3,741,682

INVENTOR
WILLIAM SWAN ROBERTSON

BY  *Norris & Bateman*
NORRIS & BATEMAN

AERATORS

This invention concerns aerators of the kind (hereinafter termed of the kind referred to) adapted to be rotated in the surface of a liquid for the purpose of agitating and aerating same, and particularly, though by no means exclusively, suitable for use in the aeration of sewage liquors in the so-called activated sludge process.

Many kinds of aerator are known, but such usually operate at rotational speeds necessitating the use of expensive reduction gear units in their driving systems. Certain aerators which operate at higher speeds are known but such generally tend to have lower efficiencies.

It is amongst the objects of the present invention to provide an aerator having an efficiency comparable with those characteristic of conventional aerators and adapted to operate in the lower speed ranges, and also capable of operating at relatively higher speeds, which can be achieved with less expensive driving systems.

According to the present invention an aerator of the kind referred to comprises a support member adapted to be rotated about its central vertical axis, a plurality of angularly spaced blades secured to the underside of said member and extending from a central region of the member towards its periphery, characterized in that each said blade has a plate secured to its lower edge and extending on both sides of the blade along at least a part of the length of the blade from its outer end towards the center of the aerator.

The invention will be further apparent from the following description with reference to the several figures of the accompanying drawing, which show, by way of example only, one form of aerator embodying the invention.

Figure 3:
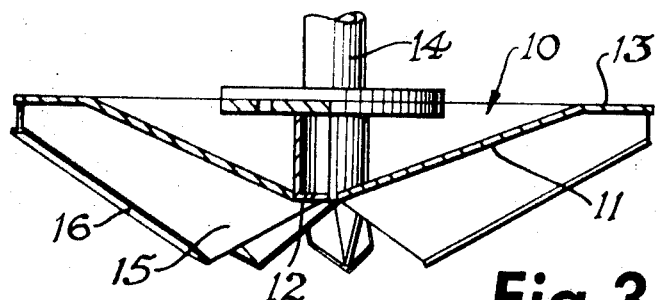
FIG. 3 shows a cross-section through the aerator on the line III–III of FIG. 2.

Referring now to the drawing it will be seen that the aerator includes a support member generally indicated at 10. The support member 10 is in the form of an inverted, truncated conical shell 11 which terminates at its lower end with a circular plate 12 disposed in a horizontal plane, and which terminates at its upper end with an outwardly projecting annular flange 13 which is also disposed in a horizontal plane. The support member 10 is adapted to be rotated about its central vertically disposed axis by a drive shaft generally indicated at 14.

Secured to the underside of the support member 10 are a plurality of angularly spaced blades 15 each disposed in a vertical plane. As best seen from FIG. 2, each of the blades 15 extends tangentially from the periphery of the circular locality at the base of the support member 10 defined by the plate 12, to the outer periphery of the flange 13. Each blade 15 is profiled, as best seen from FIG. 3 so as to have a maximum depth at a position intermediate the circular locality and outer periphery of the flange 13, the depth of the blade on either side of this position reducing gradually, and to zero at its inner end.

Figure 1:
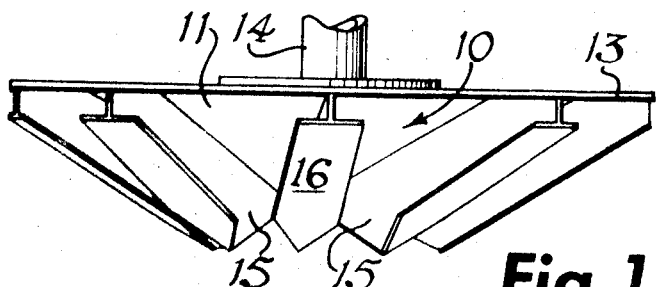
FIG. 1 shows a side elevation of the aerator.
Figure 2:
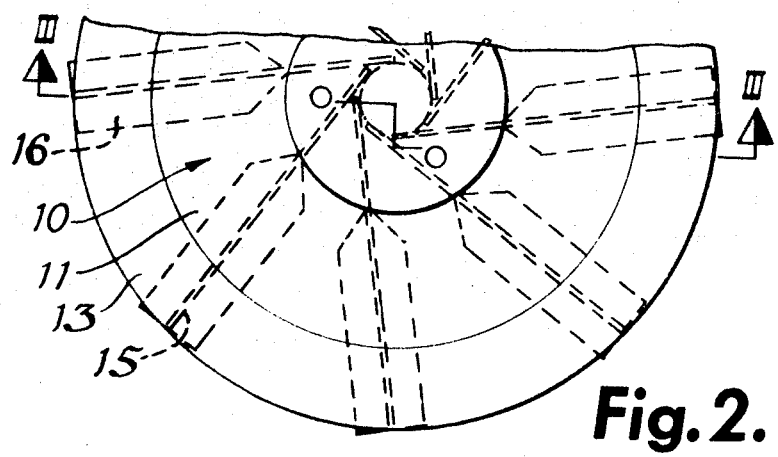
FIG. 2 shows a plan view of the aerator of FIG. 1.

Secured to the lower edge of each blade 13 between the point of maximum depth and the outer end of the blade is a plate 16 which extends on both sides of the blade normal thereto, as clearly seen from FIGS. 1 and 2.

In use, the aerator is adapted to be rotated in the surface of a liquid to be agitated and aerated. It will be understood that liquid is thrown outwardly by centrifugal action through the U-shaped duct defined on the leading side of each blade with respect to the direction of rotation, by the support member 10, blade 15 and plate 16, and that air is drawn down the U-shaped duct on the trailing side of each blade with respect to the direction of rotation and defined by the same parts. This air is drawn down into the region of maximum turbulence and ensures a good transfer of oxygen to the liquid being aerated.

Tests with aerators having the construction described above have shown that rates of oxygen transfer comparable with those obtained with conventional aerators, such as that described in our prior British Pat. No. 919,467 for example, can be achieved at the same power consumption, but whilst operating at higher speeds, thus reducing the cost of gearing in the drive system for the aerator.

Due to the fact that the blades 15 extend tangentially from the circular locality at the base of the member 10, different power consumptions and hence rates of oxygen transfer can be obtained by rotating the aerator in different directions.

It will be appreciated that it is not intended to limit the invention to the above example only, many variations, such as might readily occur to one skilled in the art, being possible, without departing from the scope thereof, as defined by the appended claims.

What is claimed is:

1. An aerator adapted to be rotated in either direction in the surface of a liquid for the purpose of agitating and aerating same comprising a support member adapted to be rotated about its central vertical axis, a plurality of angularly spaced blades secured to the underside of said member and extending from a central region of the member toward the outer periphery of said member, characterized in that said central region has a circular locality adjacent the center of the bottom of said member, each said blade extends substantially tangentially from said circular locality and a plate is secured to the lower edge of each such blade and extends on both sides of said blade along at least a part of the length of the blade beneath said member from the outer end of the blade toward the center of the aerator.

2. An aerator according to claim 1, in which each said blade has a maximum depth intermediate its ends, the position on the lower edge of the blade at its deepest point also defining the lowest point of the blade.

3. An aerator according to claim 2 in which the depth of said blade reduces gradually between said position of maximum depth and each end.

4. An aerator according to claim 2, in which said plate extends along said blade from said position of maximum depth to the outer end thereof.

5. An aerator according to claim 1, in which a drive shaft is fixed centrally to said support member for rotating same about a central vertically disposed axis.

6. An aerator according to claim 1, in which each said plate extends normal to its associated blade on both sides thereof.

7. An aerator adapted to be rotated in the surface of a liquid for the purpose of agitating and aerating same comprising a support member adapted to be rotated about its central vertical axis, a plurality of angularly spaced blades secured to the underside of said member and extending from a central region of the member toward the outer periphery of said member, characterized in that said central region has a circular locality adjacent the center of said member, each said blade extends substantially tangentially from said circular locality and a plate is secured to the lower edges of each such blade and extends on both sides of said blade along at least a part of the length of the blade from its outer end toward the center of the aerator, said support member comprising an inverted truncated conical shell having a circular plate at its lower end at said circular locality disposed in a horizontal plane and an outwardly projecting annular flange at its upper end also disposed in a horizontal plane.

8. An aerator according to claim 7, in which each said blade has a maximum depth intermediate its ends, the position on the lower edge of the blade at its deepest point also defining the lowest point of the blade.

9. An aerator as defined in claim 1 wherein each blade terminates at the outer periphery of said member and has a lowermost point intermediate said circular locality and the outer periphery of said member, and each plate extends between said lowermost point and the outer periphery of said member.

* * * * *